United States Patent
Berry

(10) Patent No.: US 6,198,755 B1
(45) Date of Patent: Mar. 6, 2001

(54) TIME MULTIPLEXING/DEMULTIPLEXING METHOD

(75) Inventor: Allan D Berry, Wyken (GB)

(73) Assignee: Marconi Communications Limited (GB)

(*) Notice: Subject to any disclaimer, the term of this patent is extended or adjusted under 35 U.S.C. 154(b) by 0 days.

(21) Appl. No.: 09/029,090
(22) PCT Filed: Aug. 15, 1996
(86) PCT No.: PCT/GB96/01991
§ 371 Date: Apr. 21, 1998
§ 102(e) Date: Apr. 21, 1998
(87) PCT Pub. No.: WO97/08858
PCT Pub. Date: Mar. 6, 1997

(30) Foreign Application Priority Data

Aug. 23, 1995 (GB) .................................. 9517198

(51) Int. Cl.⁷ ............................................ H04J 3/02
(52) U.S. Cl. ............................................... 370/537
(58) Field of Search .................... 370/535, 536, 370/532, 537, 539, 540, 541, 542, 538, 916

(56) References Cited

U.S. PATENT DOCUMENTS

| | | | | |
|---|---|---|---|---|
| 3,912,872 | * | 10/1975 | Callens ................................ | 370/535 |
| 5,062,105 | * | 10/1991 | Mcknight et al. ................... | 370/543 |
| 5,729,535 | * | 3/1998 | Rostoker et al. .................... | 370/328 |

* cited by examiner

Primary Examiner—Hassan Kizou
Assistant Examiner—Inder Pal Mehra
(74) Attorney, Agent, or Firm—Kirschstein, et al.

(57) ABSTRACT

A multiplexing/demultiplexing method comprises, during multiplexing, taking one bit from a time slot of each of a plurality of information data signals to form an information data sequence. The information data sequence is combined with a fixed binary code and, during demultiplexing the combined signal is analyzed in fixed bit length blocks to derive the information data. The code is selected such that the combined data signal has, for each possible information data sequence, a set of unique values irrespective of the starting point of the combined signal within the block. In this way there is no need to incorporate any alignment procedures during demultiplexing.

4 Claims, 1 Drawing Sheet

TIME MULTIPLEXING/DEMULTIPLEXING METHOD

BACKGROUND OF THE INVENTION

This invention relates to a multiplexing/demultiplexing method, in particular for conveying a plurality of binary digital signals within a single higher rate binary digital signal and which does not require an alignment process at the receiving end in order to decompose the combined signal into its constituent parts and convey them to their correct destinations.

Known multiplexing/demultiplexing methods use a process often referred to as "alignment" in order to unambiguously identify the constituent parts of the combined signal. For example some multiplexing methods use bit or byte interleaving of the lower rate signals, and include in the transmitted signals some extra bits, e.g. those of a frame alignment word, parity coding, or carter coding. Other methods use block coding with parallel inputs and a serial output.

At the receiving end where demultiplexing is to take place the received signal must be disinterleaved or decoded and the start and finish of each frame or code block must be known. This is often referred to as "alignment", a process which comprises searching in either serial or parallel form for correct alignment by counting the number of correct false and consecutive alignment positions as an aid to stopping or starting the search procedure, or otherwise deducing the start and finish of each frame or block from some property added to them by the multiplexing method. Known examples are the frame structures defined in ITU recommendations G.741 and G.751.

Another known method, which does not of necessity require that the transmitted rate is greater than the sum of the individual rates of the signals being multiplexed together, uses bit or byte interleaving, but depends upon at least one of the individual signals having a known property of its bit sequence which is different from the others, e.g. a frame word, so that it can be identified. This may be regarded as a special case of the method described previously in which extra bits are incorporated into one of the individual signals before multipexing. It still requires a process of alignment during demultiplexing.

SUMMARY OF THE INVENTION

This invention, in one aspect, provides a multiplexing/demultiplexing method comprising, during multiplexing, taking at least one bit from a time slot of each of a plurality of information data signals to form an information data sequence, combining the information data sequence with a fixed binary code to generate a combined data set, sequentially transmitting combined data sets as a signal and, during demultiplexing, analysing the combined data signal in blocks of length equal to that of a combined data set to derive the information data, the code being selected such that any block has, for each possible information data sequence, one of a set of unique values irrespective of the starting point of the block within the combined data signal.

By using the method, there is no need to incorporate any alignment procedures during demultiplexing.

The method enables two or more normally synchronous binary digital signals to be conveyed on a single higher rate binary digital signal whose rate is an integer multiple of the nominal rate of any of the individual signals. The method may also be employed where the individual signals at different rates, for example integer multiple signals of some lower rate, and the multiplexed signal rate is an integer multiple of the HCF (Highest Common Factor), otherwise known as the GCD (Greatest Common Divider), of all the individual signal rates. In such a case, during any time slot, different numbers of bits may be taken from each individual signal. Similarly the higher rate signal may only be a subsidiary signal being conveyed as part of a still higher rate signal using either the same or a different multiplexing method. As used herein "time slot" is a time during which an integer number of bits, preferably the lowest number, can be taken from each signal to be combined.

BRIEF DESCRIPTION OF THE DRAWINGS

In order that the invention may be well understood embodiments thereof will now be described with reference to the accompanying diagrammatic drawings in which.

DETAILED DESCRIPTION OF THE PREFERRED EMBODIMENTS

Figure 1:
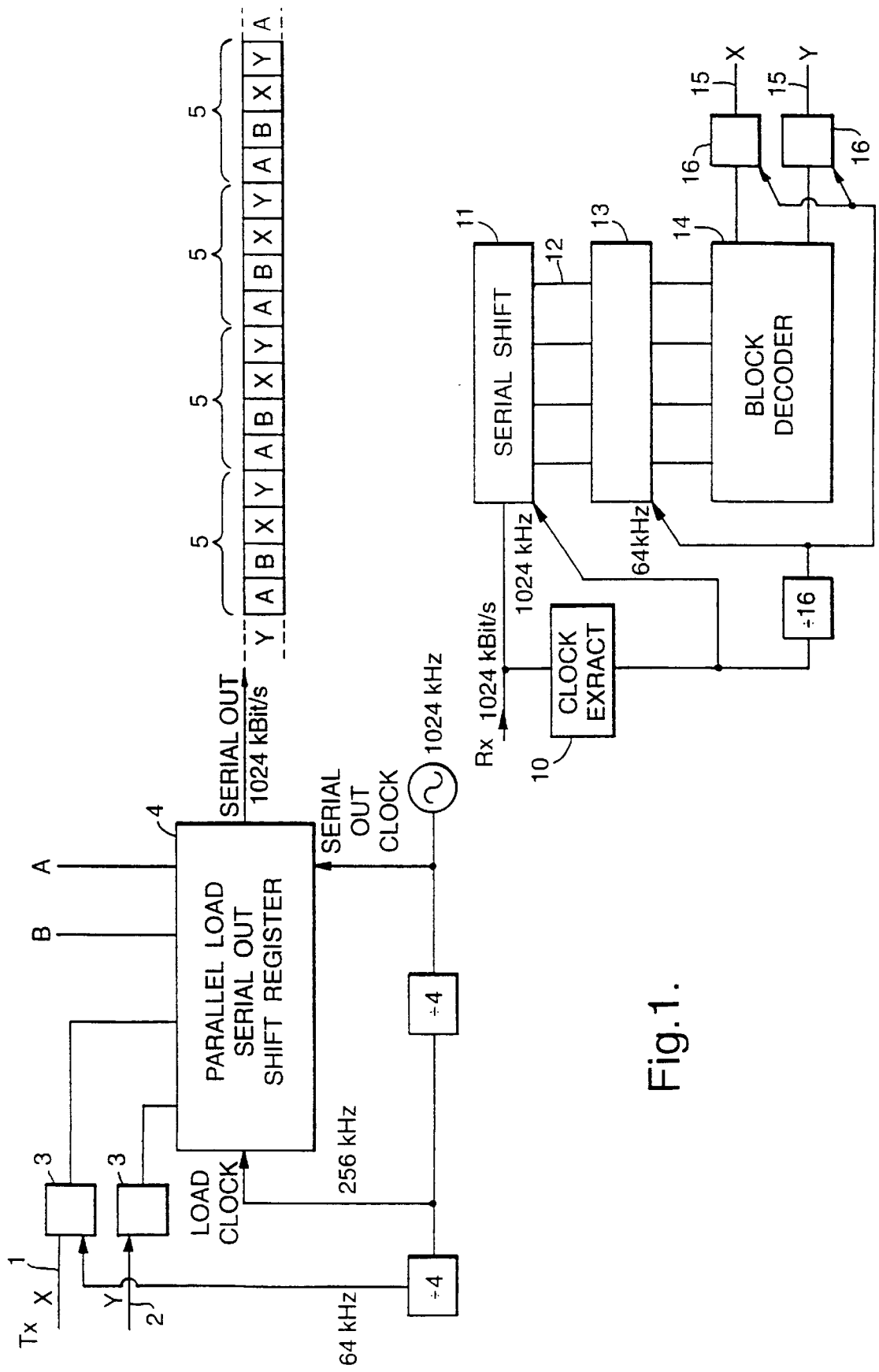
FIG. 1 shows a multiplexing transmitter and demultiplexing receiver which may be used for performing the method according to the invention.

An example will be described with reference to FIG. 1 in which two individual signals at 64 Kbit/s, X and Y, are conveyed on a higher rate signal at 1024 Kbit/s. A multiplexer or transmitter $T_x$ comprises inputs 1, 2 to receive respective streams of traffic or real data X, Y. Each input 1, 2 is connected to a respective flip flop 3 from where the signals are clocked at the rate of 64 Kbit/s into a parallel load serial out shift register 4. The remaining digital signals consist of a fixed code A, B whose values are selected according to the rules described below. Multiplexed, serial data is then read out of the shift register 4 at a rate of 1024 Kbit/s.

In one time slot of the individual signal rate, there are two bits of information to be conveyed, namely one from each of the inputs X and Y. There are 16 bits in this time period to be transmitted at the higher rate. The higher rate signal is transmitted as four blocks 5 of ABXY.

At the receiver $R_x$ a clock extract circuit 10 extracts a 1024 KHz clock signal for loading the incoming serial data into a serial shift register 11. A parallel load 12 is then clocked out into a buffer 13 before being clocked out at a 64 KHz rate into a block decoder 14. A block 5 comprising four consecutive bits of data is decoded within the decoder 14 and the real or information bearing signals X, Y are clocked out of respective output lines 15 via flip flops 16. As will be described later on the decoding process requires no alignment in order to extract the correct values of X and Y—i.e. it does not matter which is the first of any four contiguous bits of data to be decoded due to the fixed bit code AB. In this case there are two combinations of A and B which are satisfactory, namely 01 or 10. The four contiguous bits selected in the decoder 14 will be any of the four possibilities ABXY, BXYA, XYAB or YABX. In the last case, the X and Y bits may be from different time slots of the original signals, if the selection is made across the boundary of the set of 16 bits, but this only puts a one bit delay in one signal compared to the other. To illustrate that the decoding is unambiguous all possible combinations are listed below, and the decimal value of each block is given as an aid;

| if X= | 0 | 0 | 1 | 1 | (binary) |
|---|---|---|---|---|---|
| and Y= | 0 | 1 | 0 | 1 | (binary) | and if A=0 and B=1, then the transmitted patterns will be four blocks of

| 0100 = 4 | 0101 = 5 | 0110 = 6 | 0111 = 7 |
|---|---|---|---| and the blocks of four bits selected at the receiving end would be

|    | | | | |
|---|---|---|---|---|
|    | 0100 = 4 | 0101 = 5 | 0110 = 6 | 0111 = 7 |
| or | 1000 = 8 | 1010 = 10 | 1100 = 12 | 1110 = 14 |
| or | 0001 = 1 | 0101 = 5 | 1001 = 9 | 1101 = 13 |
| or | 0010 = 2 | 1010 = 10 | 0011 = 3 | 1011 = 11 |

Hence it can be seen that, for each possible information sequence, the block of data has a unique set of values irrespective of the start point of the data within the block.

There are two unused blocks, namely those of value 0 and 15, which might occur due to errors in the received signal, and preferably these are decoded as X, Y=0, 0 and 1, 1 respectively. The decoding table is:

| received block value | X | Y |
|---|---|---|
| 0,1,2,4,8 | 0 | 0 |
| 5,10 | 0 | 1 |
| 3,6,9,12 | 1 | 0 |
| 7,11,13,14,15 | 1 | 1 | similarly, if A=1 and B=0, then the transmitted patterns are four blocks of

| 1000 = 8 | 1001 = 9 | 1010 = 10 | 1011 = 11 |
|---|---|---|---| and the blocks of four bits selected at the receiving end are

|    | | | | |
|---|---|---|---|---|
|    | 1000 = 8 | 1001 = 9 | 1010 = 10 | 1011 = 11 |
| or | 0001 = 1 | 0011 = 3 | 0101 = 5 | 0111 = 7 |
| or | 0010 = 2 | 0110 = 6 | 1010 = 10 | 1110 = 14 |
| or | 0100 = 4 | 1100 = 12 | 0101 = 5 | 1101 = 13 |

This is very similar to the above; the decoding table is:

| received block value | X | Y |
|---|---|---|
| 0,1,2,4,8 | 0 | 0 |
| 3,6,9,12 | 0 | 1 |
| 5,10 | 1 | 0 |
| 7,11,13,14,15 | 1 | 1 |

It is not necessary that the blocks of code should be repeated, otherwise than to achieve the desired higher rate signal. As a second example the two 64 kbit/s signals are conveyed over a higher rate signal at 256 kbit/s with these same blocks, and the same decoding rules.

In general one bit from each time slot of two or more individual digital binary signals is combined with a suitable number of fixed bits, and the set of N bits is sent serially at the higher rate. If desired the set may be repeated an integral number of times to suit the higher rate. The binary values of the fixed bits are chosen such that any consecutive sets of N bits received at the higher rate may be unambiguously decoded to find the value of the bits of the constituent lower rate signals. The start and finish of the set of N bits which have to be decoded do not have to coincide with those of the original set. If the set of N bits has been repeated to make a total of K sets including the original, it is sufficient to decode only one set of N bits from every K sets received. If the lower rate signals are not in phase with one another and if the sets are repeated at least once, then each set of N bits may contain the most recent bit of each of the lower rate channels, but in this case, if only one set in K is decoded, the output lower rate signals will have the same phase as one another, that is to say they will have different relative delays introduced into their transmission paths. Alternatively, if every set is decoded, the output phase of the lower rate signals will be preserved within the quantization steps introduced by the K sets per time slot.

If the lower rate signals are not precisely synchronous with the sub multiple of the higher rate signal, then this method will introduce either bit slips or jitter steps quantised by the K sets per time slot mentioned above.

Further examples are described below, where it will be seen that the number of channels may be increased as may be the length of the fixed bit code to suit the particular circumstances.

Example 3. Two individual signals at 64 kbit/s are conveyed on a higher rate signal at 320 kbit/s. In one time slot of the individual signal rate, two bits of information are conveyed, X and Y, but five bits are transmitted at the higher rate. The high rate signal is transmitted as consecutive blocks of ABCXY, where A, B and C are fixed bits, chosen in such a way that will enable demultiplexing without alignment to be performed. In this case there are four possible combinations of A, B and C which are satisfactory, namely 001, 011, 100 and 110.

At the receiving end, it is sufficient to select any five consecutive bits, and to decode them, as shown below. The five bits selected will be any of the five possibilites ABCXY, BCXYA, CXYAB, XYABC, YABCX. In the last case, the X and the Y bits may be from different time slots of the original signals, but this only puts a 1 bit delay in one signal compared to the other. All possible combinations are presented here; [the decimal value of each block is given as an aid]:

| if X= | 0 | 0 | 1 | 1 | (binary) |
|---|---|---|---|---|---|
| and Y= | 0 | 1 | 0 | 1 | (binary) | and if A=0, B=0 and C=1, then the transmitted patterns are blocks of

| 00100 = 4 | 00101 = 5 | 00110 = 6 | 00111 = 7 |
|---|---|---|---| and the blocks of five bits selected at the receiving end are

|    | 00100 = 4  | 00101 = 5  | 00110 = 6  | 00111 = 7  |
|----|------------|------------|------------|------------|
| or | 01000 = 8  | 01010 = 10 | 01100 = 12 | 01110 = 14 |
| or | 10000 = 16 | 10100 = 20 | 11000 = 24 | 11100 = 28 |
| or | 00001 = 1  | 01001 = 9  | 10001 = 17 | 11001 = 25 |
| or | 00010 = 2  | 10010 = 18 | 00011 = 3  | 10011 = 19 |

Thus it is seen that the decoding of the blocks may be done without ambiguity; there are twelve unused blocks, namely those of value 0, 11, 13, 15, 21, 22, 23, 26, 27, 29, 30, and 31, which might occur due to errors in the received signal, and preferably these are decoded to give minimum error multiplication, as shown below. The decoding table is then:

| received block value (error free) | (errored) | X | Y |
|---|---|---|---|
| 1,2,4,8,16 | 0 | 0 | 0 |
| 5,9,10,18,20 | 11,13,21,22,26 | 0 | 1 |
| 3,6,12,17,24 |  | 1 | 0 |
| 7,14,19,25,28 | 15,23,27,29,30,31 | 1 | 1 |

[similar decoding tables can be generated for ABC=011, 100 or 110.

Example 4: Three individual signals at 64 kbit/s are conveyed on a higher rate signal at 384 kbit/s. In one time slot of the individual signal rate, there are three bits of information to be conveyed X, Y and Z; there are 6 bits to be transmitted at the higher rate. The high rate signal is transmitted as consecutive blocks of ABCXYZ, where A, B and C are fixed bits, chosen in such a way that will enable demultiplexing without alignment to be performed. In this case there are four possible combinations of A, B and C which are satisfactory, namely 001, 011, 100 and 110.

At the receiving end, it is sufficient to select any six consecutive bits, and to decode them, as shown below. The six bits selected are any of the six possibilities ABCXYZ, BCXYZA, CXYZAB, XYZABC, YZABCX, ZABCXY. In the last two cases, the X or Z bits may be from different time slots of the original signals, but this only puts a 1 bit delay in one or two of the signals compared to the other(s). All possible combinations are presented here; [the decimal value of each block is given as an aid]:

| if X = 0  | 0 | 0 | 0 | 1 | 1 | 1 | 1 |
|-----------|---|---|---|---|---|---|---|
| and Y = 0 | 0 | 1 | 1 | 0 | 0 | 1 | 1 |
| and Z = 0 | 1 | 0 | 1 | 0 | 1 | 0 | 1 | and if A=0, B=0 and C=1, then the transmitted patterns are blocks of

| 001-000 | 001001 | 001010 | 001011 | 001100 | 001101 | 001110 | 001111 |
|---|---|---|---|---|---|---|---|
| =8 | =9 | =10 | =11 | =12 | =13 | =14 | =15 | and the blocks of six bits selected at the receiving end are

| 001-000 | 001001 | 001010 | 001011 | 001100 | 001101 | 001110 | 001111 |
|---|---|---|---|---|---|---|---|
| =8 | =9 | =10 | =11 | =12 | =13 | =14 | =15 |

-continued

| 010-000 | 010010 | 010100 | 010110 | 011000 | 011010 | 011100 | 011110 |
|---|---|---|---|---|---|---|---|
| =16 | =18 | =20 | =22 | =24 | =26 | =28 | =30 |
| 100-000 | 100100 | 101000 | 101100 | 110000 | 110100 | 111000 | 111100 |
| =32 | =36 | =40 | =44 | =48 | =52 | =56 | =60 |
| 000-001 | 001001 | 010001 | 011001 | 100001 | 101001 | 110001 | 111001 |
| =1 | =9 | =17 | =25 | =33 | =41 | =49 | =57 |
| 000-010 | 010010 | 100010 | 110010 | 000011 | 010011 | 100011 | 110011 |
| =2 | =18 | =34 | =50 | =3 | =19 | =35 | =51 |
| 000-100 | 100100 | 000101 | 100101 | 000110 | 100110 | 000111 | 100111 |
| =4 | =36 | =5 | =37 | =6 | =38 | =7 | =39 |

Thus it is seen that the decoding of the blocks is done without ambiguity; the only repetitions which occur are blocks of values 9, 18 and 36, all of which are correctly decoded as XYZ=001. There are 19 unused blocks, namely those of values 0, 21, 23, 27, 29, 31, 42, 43, 45, 46, 47, 53, 54, 55, 58, 59, 61, 62 and 63, which might occur due to errors in the received signal, and these are preferably decoded to give minimum error multiplication, as shown below. The decoding table is then:

| received block value (error free) | (errored) | X | Y | Z |
|---|---|---|---|---|
| 1,2,4,8,16,32 | 0 | 0 | 0 | 0 |
| 9,18,36 |  | 0 | 0 | 1 |
| 5,10,17,20,34,40 | 21,42 | 0 | 1 | 0 |
| 11,22,25,37,44,50 | 27,45,54 [see note 1] | 0 | 1 | 1 |
| 3,6,12,24,33,48 |  | 1 | 0 | 0 |
| 13,19,26,38,41,52 | 23,29,43,46,53,58 [2] | 1 | 0 | 1 |
| 7,14,28,35,49,56 |  | 1 | 1 | 0 |
| 15,30,39,51,57,60 | 31,47,55,59,61,62,63 | 1 | 1 | 1 | note 1: for minimum error multiplication, any of these 3 block values could be decoded as XYZ=101, instead of 011
note 2: for minimum error multiplication, any of these 6 block values could be decoded as XYZ=011 or 110, instead of 101
[Similar decoding tables can be generated for ABC=011, 100 or 110].

Example 5:
Four individual signals at 64 kbit/s are conveyed on a higher rate signal at 512 kbit/s. In one time slot of the individual signal rate, there are four bits of information to be conveyed, W, X, Y and Z; 8 bits are transmitted at the higher rate. The high rate signal is transmitted as consecutive blocks of ABCDWXYZ, where A, B, C and D are fixed bits, chosen in such a way that will enable demultiplexing without alignment to be performed. In this case there are six possible combinations of A, B, C and D which are satisfactory, namely 0001, 0011, 0111, 1000, 1100 and 1110.

The eight bits selected at the receiving end will be any of the eight possibilities ABCDWXYZ, BCDWXYZA, CDWXYZAB, DWXYZABC, WXYZABCD, XYZABCDW, YZABCDWX, ZABCDWXY. In the last three cases, some of the W, X, Y or Z bits may be from different time slots of the original signals, but this only puts a 1 bit delay in some of the signals compared to the other(s). To illustrate that the decoding is unambiguous, all possible combinations are presented, after example 6 below for the case where ABCD is 0001; [only the decimal value of each block is given to avoid the tedious length of the equivalent binary representation]:

Example 6:

Four individual signals at 64 kbit/s are conveyed on a higher rate signal at 1024 kbit/s. In one time slot of the individual signal rate, there are four bits of information to be conveyed, W, X, Y and Z: there are 16 bits to be transmitted at the higher rate. The high rate signal is transmitted as two consecutive blocks of ABCDWXYZ, where A, B, C and D are fixed bits, chosen in such a way that will enable demultiplexing without alignment to be performed. In this case there are again six possible combinations of A, B, C and D which are satisfactory, namely 0001, 0011, 0111, 1000, 1100 and 1110.

At the receiving end, it is sufficient to select any eight consecutive bits out of sixteen, and to decode them, as shown below. The eight bits selected will be any of the eight possibilities ABCDWXYZ, BCDWXYZA, CDWXYZAB, DWXYZABC, WXYZABCD, XYZABCDW, YZABCDWX, ZABCDWXY. In the last three cases, some of the W, X, Y or Z bits may be from different time slots of the original signals, if the selection is made across the boundary of one of the original sets of 16 bits, but this only puts a 1 bit delay in some of the signals compared to the other(s). To illustrate that the decoding is unambiguous, all possible combinations are presented here, for the case where ABCD is 0001; [only the decimal value of each block is given]; [these apply to both examples 5 and 6]

| if  | W=0 | 0 | 0 | 0 | 0 | 0 | 0 | 0 | 1 | 1 | 1 | 1 | 1 | 1 | 1 | 1 | (binary) |
| --- | --- | - | - | - | - | - | - | - | - | - | - | - | - | - | - | - | -------- |
| and | X=0 | 0 | 0 | 0 | 1 | 1 | 1 | 1 | 0 | 0 | 0 | 0 | 1 | 1 | 1 | 1 | (binary) |
| and | Y=0 | 0 | 1 | 1 | 0 | 0 | 1 | 1 | 0 | 0 | 1 | 1 | 0 | 0 | 1 | 1 | (binary) |
| and | Z=0 | 1 | 0 | 1 | 0 | 1 | 0 | 1 | 0 | 1 | 0 | 1 | 0 | 1 | 0 | 1 | (binary) | and if A,B,C,D=0,0,0,1 then the transmitted patterns are blocks whose decimal values are 16 17 18 19 20 21 22 23 24 25 26 27 28 29 30 31 and the blocks of eight bits selected at the receiving end have values of

|    | 16  | 17  | 18  | 19  | 20  | 21  | 22  | 23  | 24  | 25  | 26  | 27  | 28  | 29  | 30  | 31  |
| -- | --- | --- | --- | --- | --- | --- | --- | --- | --- | --- | --- | --- | --- | --- | --- | --- |
| or | 32  | 34  | 36  | 38  | 40  | 42  | 44  | 46  | 48  | 50  | 52  | 54  | 56  | 58  | 60  | 62  |
| or | 64  | 68  | 72  | 76  | 80  | 84  | 88  | 92  | 96  | 100 | 104 | 108 | 112 | 116 | 120 | 124 |
| or | 128 | 136 | 144 | 152 | 160 | 168 | 176 | 184 | 192 | 200 | 208 | 216 | 224 | 232 | 240 | 248 |
| or | 1   | 17  | 33  | 49  | 65  | 81  | 97  | 113 | 129 | 145 | 161 | 177 | 193 | 209 | 225 | 241 |
| or | 2   | 34  | 66  | 98  | 130 | 162 | 194 | 226 | 3   | 35  | 67  | 99  | 131 | 163 | 195 | 227 |
| or | 4   | 68  | 132 | 196 | 5   | 69  | 133 | 197 | 6   | 70  | 134 | 198 | 7   | 71  | 135 | 199 |
| or | 8   | 136 | 9   | 137 | 10  | 138 | 11  | 139 | 12  | 140 | 13  | 141 | 14  | 142 | 15  | 143 |

Thus it is seen that the decoding of the blocks is done without ambiguity; the only repetitions which occur are blocks of values 17, 34, 68 and 136, all of which are correctly decoded as WXYZ=0001. There are 132 unused blocks, which might occur due to errors in the received signal, and again it is suggested that these should be decoded to give minimum error multiplication. The decoding table for error free blocks is then:

| received block value (error free) | W | X | Y | Z |
| --- | --- | --- | --- | --- |
| 1, 2, 4, 8, 16, 32, 64, 128 | 0 | 0 | 0 | 0 |
| 17, 34, 68, 136 | 0 | 0 | 0 | 1 |
| 9, 18, 33, 36, 66, 72, 132, 144 | 0 | 0 | 1 | 0 |
| 19, 38, 49, 76, 98, 137, 152, 196 | 0 | 0 | 1 | 1 |
| 5, 10, 20, 40, 65, 80, 130, 160 | 0 | 1 | 0 | 0 |
| 21, 42, 69, 81, 84, 138, 162, 168 | 0 | 1 | 0 | 1 |
| 11, 22, 44, 88, 97, 133, 176, 194 | 0 | 1 | 1 | 0 |
| 23, 46, 92, 113, 139, 184, 197, 226 | 0 | 1 | 1 | 1 |
| 3, 6, 12, 24, 48, 96, 129, 192 | 1 | 0 | 0 | 0 |
| 25, 35, 50, 70, 100, 140, 145, 200 | 1 | 0 | 0 | 1 |
| 13, 26, 52, 67, 104, 134, 161, 208 | 1 | 0 | 1 | 0 |
| 27, 54, 99, 108, 141, 177, 198, 216 | 1 | 0 | 1 | 1 |
| 7, 14, 28, 56, 112, 131, 193, 224 | 1 | 1 | 0 | 0 |
| 29, 58, 71, 116, 142, 163, 209, 232 | 1 | 1 | 0 | 1 |
| 15, 18, 30, 60, 120, 135, 195, 225, 240 | 1 | 1 | 1 | 0 |
| 31, 62, 124, 143, 199, 227, 241, 248 | 1 | 1 | 1 | 1 |

[similar decoding tables can be generated for ABCD = 0011, 0111, 1000, 1100 or 1110].

Despite the extra complexity of the later examples it can still be seen that fixed bit codes can be chosen which permit, for each possible real data sequence, the combined signal to have a set of unique values irrespective of the start point of the block of data decoded.

What is claimed is:

1. A multiplexing/demultiplexing method comprising the steps of: during multiplexing, taking at least one bit from a time slot of each of a plurality of information data signals to form an information data sequence; sequentially appending the information data sequence to a fixed binary code to generate a combined data set; sequentially transmitting the combined data sets as a combined data signal; and, during demultiplexing, analyzing the combined data signal in blocks of length equal to that of the combined data set to derive the information data, the code being selected such that any block has, for each possible information data sequence, one of a set of unique values irrespective of a starting point of the block within the combined data signal.

2. The multiplexing/demultiplexing method according to claim 1 in which only one bit is taken from a time slot of each of a plurality of information data signals.

3. The multiplexing/demultiplexing method according to claim 1 in which two of the information data signals are at different rates and in which, during a time slot, different numbers of bits are taken from the two signals to form the information data sequence.

4. The multiplexing/demultiplexing method according to claim 1 in which the combined data set is repeated as many times as is necessary to give a desired transmitted multiplexed rate.

* * * * *